Sept. 4, 1945.　　　　M. G. CLAY　　　　2,384,366
TRUCK DRIVING MECHANISM
Filed July 9, 1943　　　　3 Sheets-Sheet 1
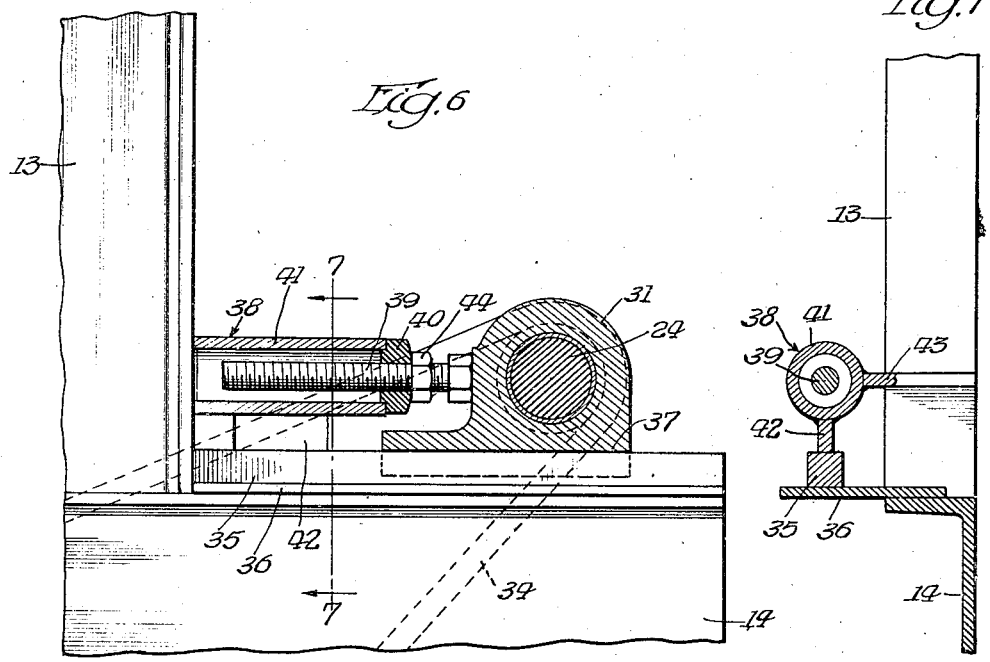
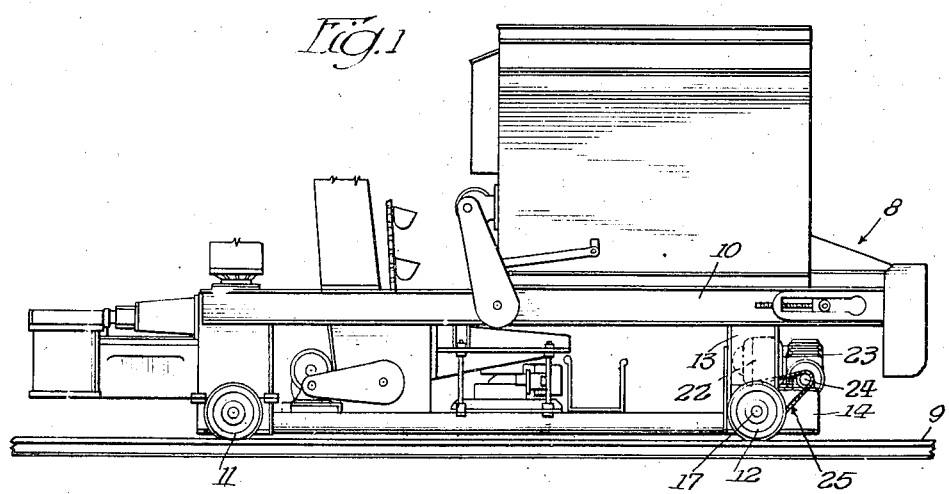
Inventor
Murray G. Clay
By Fred Gerlach, Atty

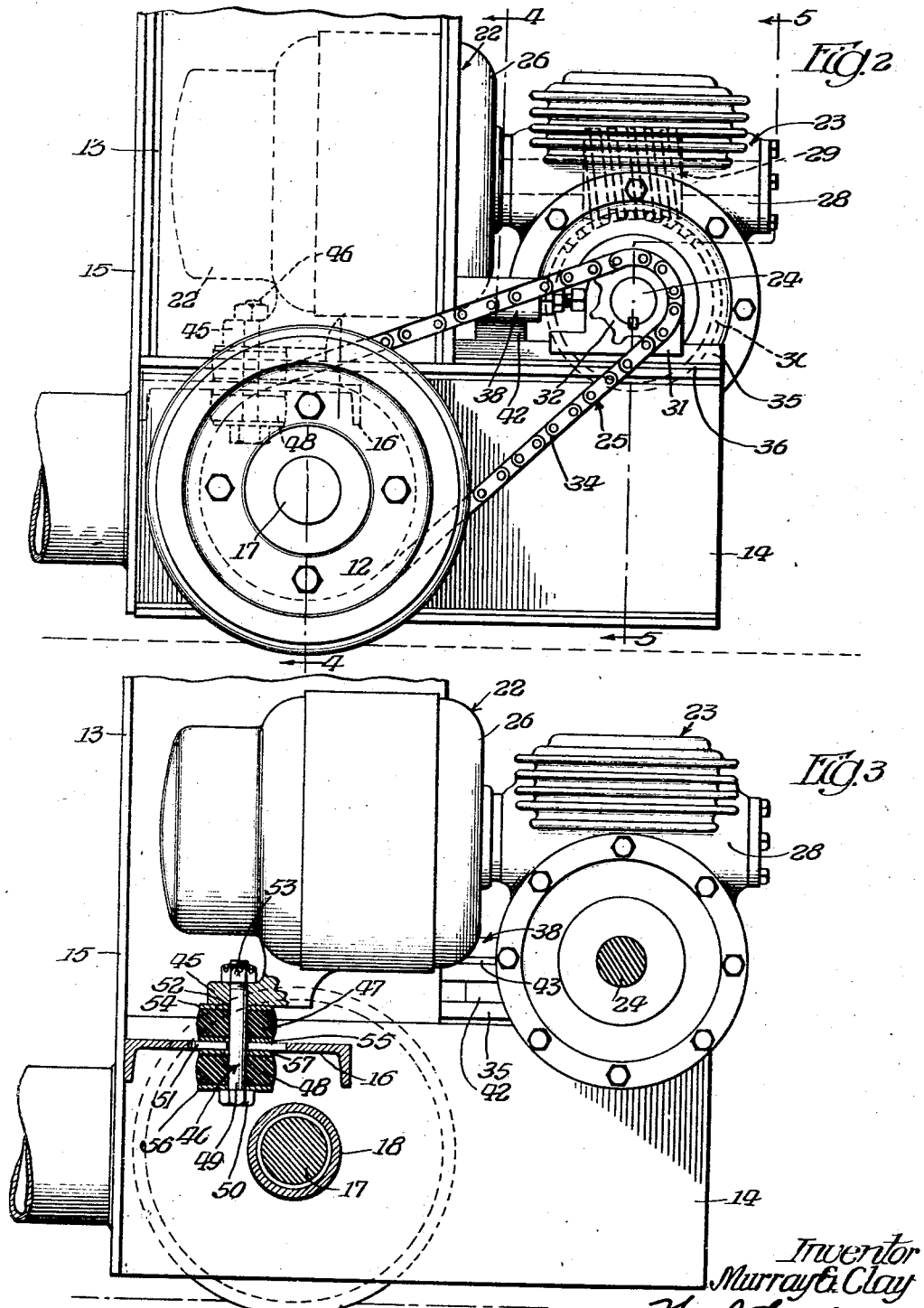

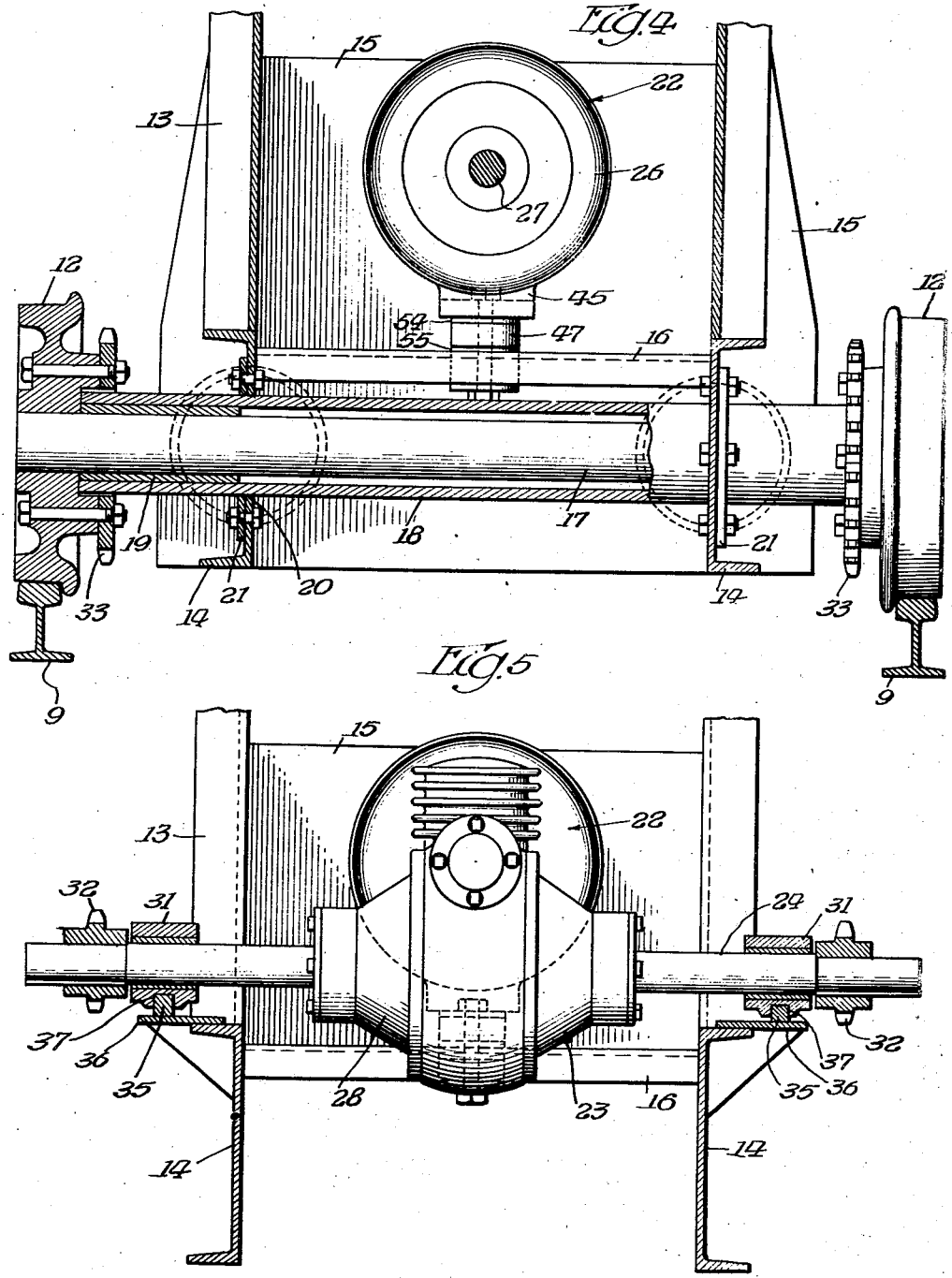

Patented Sept. 4, 1945

2,384,366

UNITED STATES PATENT OFFICE 2,384,366

TRUCK DRIVING MECHANISM

Murray G. Clay, Chicago, Ill., assignor to The Beardsley & Piper Company, Chicago, Ill., a corporation of Illinois Application July 9, 1943, Serial No. 493,977

3 Claims. (Cl. 105—101)

The present invention relates generally to mechanism for use in driving a truck back and forth along a track. More particularly the invention relates to that type of driving mechanism that is designed primarily for use in connection with a truck having a transversely extending axle with a pair of track engaging traction wheels at its ends, and comprises (1) a reversible electric motor, (2) a gear type speed reducing unit which is connected to the armature shaft of the electric motor for drive thereby, (3) a drive shaft which forms a part of, and is driven by, the gears of the unit and is arranged so that it extends transversely of the truck and is in parallel and in laterally spaced relation with the axle for the traction wheels, and (4) a pair of chain and sprocket connections which serve drivably to connect the drive shaft to the wheels, and consist of sprockets on the ends of the drive shaft, sprocket wheels on the traction wheels and endless chains around the sprockets and sprocket wheels.

One object of the invention is to provide a truck driving mechanism of this type which is an improvement upon, and has certain advantages over, previously designed truck driving mechanism and is characterized by exceptionally high efficiency and long life and also compactness and simplicity of design and construction.

Another object of the invention is to provide a truck driving mechanism of the type under consideration in which the electric motor, speed reducing unit, and drive shaft are in the form of a unit and are mounted on the truck so that they may be slid or adjusted longitudinally of the truck in order to take up any looseness which may develop in the endless chains of the chain and sprocket connections.

Another object of the invention is to provide in connection with a truck driving mechanism of the last mentioned character slide type bearings for rotatably supporting the ends of the drive shaft together with simple and novel means for sliding the bearings in order to effect longitudinal adjustment of the motor, speed reducing unit and drive shaft for chain take-up purposes.

A further object of the invention is to provide a truck driving mechanism of the type and character under consideration in which the electric motor is supported so that in addition to being slidable lengthwise of the truck it is free to swing bodily about the axis of the drive shaft and the support or mount for the motor includes resilient means for limiting swinging of the motor and absorbing shock which normally results when the motor is started in connection with drive of the truck along its track.

A still further object of the invention is to provide a truck driving mechanism which is generally of new and improved construction and not only is highly efficient in operation but also is capable of being produced at a comparatively low cost.

Other objects of the invention and the various advantages and characteristics of the present driving mechanism will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side view of a truck having applied to the traction wheels thereof a driving mechanism embodying the invention;

Figure 2 is an enlarged side elevation of the improved mechanism showing the construction and arrangement of the chain and sprocket driving connections between the ends of the drive shaft and the axle for the traction wheels of the truck;

Figure 3 is a vertical longitudinal section of the mechanism illustrating in detail the mount whereby the electric motor of the mechanism is permitted to slide longitudinally of the truck and is also cushioned against shock due to its tendency to swing bodily around the axis of the drive shaft in connection with starting thereof;

Figure 4 is a vertical transverse section taken on the line 4—4 of Figure 2 and showing the manner in which the axle for the traction wheels of the truck is journalled;

Figure 5 is a vertical transverse section taken on the line 5—5 of Figure 2 and illustrating in detail the manner in which the bearings for supporting the ends of the drive shaft of the mechanism are mounted for sliding movement lengthwise of the truck;

Figure 6 is a longitudinal section of one of the drive shaft supporting bearings, showing in detail the manner in which such bearing is slidably mounted, and illustrating the construction and design of the adjusting means therefor; and Figure 7 is a transverse section on the line 7—7 of Figure 6.

The driving mechanism which is shown in the drawings constitutes the preferred form or embodiment of the invention. It is illustrated in connection with a truck 8 and, as hereinafter described, serves as a medium for propelling the truck back and forth along a track in the form of a pair of laterally spaced parallel rails 9. The truck 8 represents one form of variety of vehicle with which the improved driving mechanism is usable and is of the type that forms a part of the flask filling foundry machine like that disclosed in, and forming the subject matter of, United States Letters Patent No. 1,774,076, dated August 26, 1930. Such a machine embodies, in addition to the truck, a sand hopper with an open bottom, a horizontally extending endless conveyor beneath the hopper, an upstanding bucket conveyor at the discharge end of the endless conveyor, and a rotary projector for forming the sand that is delivered by the bucket conveyor into wads and slinging such wads into subjacent flasks, and these parts or elements are mounted on the truck.

The truck 8 comprises a pair of main laterally spaced parallel channel beams 10 and is supported at its front end by way of a pair of flanged rail engaging idler wheels 11 and at its rear end by way of a pair of flanged rail engaging traction wheels 12. The rear end of the truck, i. e., the end that is supported by the traction wheels 12, embodies a pair of vertically extending channel beams 13 and a pair of horizontally extending channel beams 14. The vertically extending channel beams 13 are connected to, and depend from, the rear ends of the main channel beams 10 of the truck and are cross connected by way of a plate 15. They are spaced laterally apart the same distance as the main channel beams 10 and are arranged so that the webs thereof extend lengthwise of the truck and their flanges project outwards. The plate 15 is welded or otherwise fixedly secured to the front flanges of the vertically extending channel beams 13. The horizontally extending channel beams 14 are arranged so that the webs thereof extend vertically and also lengthwise of the truck and their flanges project outwards. The front ends of the beams 14 underlie, and are fixedly secured to, the lower ends of the vertically extending channel beams 13 and abut against, and are welded or otherwise fixedly secured to, the lower corners of the plate 15. The rear ends of the beams 14 project rearwards of the vertically extending beams 13, as best shown in Figures 2 and 3. A horizontally extending channel beam 16 serves to cross connect the horizontally extending channel beams 14 and holds such beams in fixed laterally spaced relation. It extends between, and is welded at its ends to, the front ends of the beams 14 and is arranged so that the web thereof extends horizontally and the flanges project downwards. The traction wheels 12 are keyed or otherwise fixedly secured to the ends of an axle 17. The latter, as shown in Figure 4, extends through a tubular shaft 18 and is journalled at its ends in a pair of bearings 19 in the ends of the tubular shaft. Such shaft extends transversely of the truck 8 and has the ends thereof projecting through holes 20 in the front ends of the webs of the horizontally extending channel beams 14. Two ring shaped plates 21 serve to hold the tubular shaft 18 against axial displacement with respect to the truck. These plates extend around, and are welded to, the ends of the tubular shaft and are bolted to the hole defining portions of the webs of the horizontally extending channel beams 14.

As its main or principal parts the driving mechanism for the truck 8 comprises an electric motor 22, a gear type speed reducing unit 23, a drive shaft 24 and a pair of chain and sprocket connections 25. As hereinafter described, the motor, speed reducing unit and drive shaft are in the form of a unit.

As shown in Figure 4, the electric motor 22 is located midway between the lower ends of the vertically extending channel beams 13 and overlies the horizontally extending channel beam 16 and the tubular shaft 18. It is of the 3-phase reversible type and comprises a casing 26 and an armature (not shown). The armature is mounted on, and rotatably supported by, a shaft 27. The electric motor 26 is so positioned that the armature and shaft extend lengthwise of the truck and are substantially horizontal. The rear end of the armature shaft 27 projects rearwards of the motor casing 22.

The speed reducing unit 23 is located directly behind the reversible electric motor 22 and comprises a housing 28, a worm 29 and a worm gear 30. The upper portion of the housing 28 surrounds the worm 29 and is suitably fixedly secured to the rear end of the casing 26 of the electric motor 22. The rear end of the armature shaft of the electric motor projects into the upper portion of the housing 28 of the speed reducing unit. The worm 29 is keyed or otherwise fixedly secured to the rear end of the armature shaft 27 and is journalled in bearings in the upper portion of the housing 28. The lower portion of the housing surrounds or encases the worm gear 30. The latter meshes with, and is driven by, the worm 29 in response to drive of the electric motor 22. It is positioned so that the axis thereof extends horizontally and also transversely of the truck. Suitable bearings (not shown) in the side parts of the lower portion of the housing 28 serve rotatably to support the worm gear 30.

The drive shaft 24 extends horizontally and is arranged in a transverse position so far as the truck is concerned. The central portion of the drive shaft extends through the lower portion of the housing 28 of the speed reducing unit 23 and has the worm gear 30 fixedly connected to it. The ends of the shaft 24 overlie and project beyond the rear ends of the horizontally extending channel beams 14 and are journalled in a pair of bearings 31.

The chain and sprocket connections 25 serve drivably to connect the drive shaft 24 to the traction wheels 12 of the truck 8 and consist of sprockets 32, sprocket wheels 33 and endless chains 34. The sprockets 32 are keyed to the ends of the drive shaft 24 and are located directly outwards of the bearings 31. The sprocket wheels 33 are ring shaped and extend loosely around the ends of the tubular shaft 19 for the axle 17. They are aligned with the sprockets 32 and are bolted to the inner ends of the hub portions of the traction wheels 12. The endless chains 34 extend around the sprockets 32 and the sprocket wheels 33 as shown in Figure 2. When the electric motor 22 is driven in one direction the traction wheels are driven in one direction through the medium of the worm 29, the worm gear 30, the drive shaft 24 and the chain and sprocket connections 25 and propel the truck 8 in one direction along the track consisting of the rails 9. When the electric motor 22 is reversely driven the traction wheels 12 are driven in the opposite direction and cause the truck to be propelled in the opposite direction along the rails 9.

The bearings 31 are mounted on a pair of slide bars 35 so that they, together with the motor, speed reducing unit and drive shaft, are slidable longitudinally of the truck in a horizontal plane. These slide bars are welded or otherwise fixedly secured to the upper faces of a pair of elongated plates 36. The latter, as shown in Figures 2 and 5, extend lengthwise of the truck and are mounted on the rear portions of the top flanges of the horizontally extending channels beams 14. The bottom portions of the bearings 31 are provided with rectilinear grooves 37 in which the upper portions of the slide bars 35 fit. By slidably mounting the bearings 31 on the slide bars 35 the motor, speed reducing unit and drive shaft may be slid or shifted rearwards in order to take up any looseness in the chains 34 resulting from wear. A pair of adjusting devices 38 serve to hold the bearings 31 in the various positions into which they are slid and also to slide the bearings rearwards, i. e., away from the traction wheels in connection with a chain take-up operation. Each of these adjusting devices, as shown in Figures 6 and 7, comprises a horizontally extending bolt 39. The heads of these bolts abut against the front portions of the bearings 31 and the shanks extend through fixed nuts 40 and project into horizontal tubes 41. The tubes overlie the front ends of the slide bars 35 and are fixedly secured in place by way of vertically extending plates 42 and horizontally extending plates 43. The vertically extending plates are welded to, and depend from, the bottom portions of the tubes and rest on, and are welded to, the front ends of the slide bars 35. The horizontal plates 43 are welded to the inner side portions of the tubes and have the front ends thereof welded to the rear flanges of the vertically extending channel beams 13. The nuts 40 are welded to the rear ends of the tubes and hence are in fixed relation with the truck. The front portions of the bearings are provided with vertically extending flat surfaces against which the heads of the bolts 39 abut. When the bolts are turned so that they are fed rearwards the bearings 31 are slid rearwards along the slide bars 35 and thus result in take-up of any looseness in the chains 34 of the chain and sprocket connections 25. Jam nuts 44 are mounted on the rear ends of the shanks of the bolts 39 and coact with the fixed nuts 40 when tightened to lock the bolts in their various adjusted positions. When it is desired slidably to adjust the bearings 31 the jam nuts 44 are released so as to free the bolts 39 for turning purposes. As previously pointed out, the adjusting devices 38 comprising the bolts 39 serve not only to hold the bearings 31 in any desired adjusted position on the slide bars 35 but also to slide the bearings rearwards along the slide bars in connection with a chain take-up operation. The adjusting devices constitute or exemplify simple means for shifting rearwards the unit consisting of the motor 22, the speed reducing unit 23 and the drive shaft 24 when it is desired to take up any looseness in the chains 34 of the chain and sprocket driving connections 25.

In addition to the foregoing parts or elements the truck driving mechanism comprises a mount for the electric motor 22. This mount permits the motor to slide horizontally in connection with adjustment of the bearings 31 and also cushions the motor and absorbs shock when the motor is started in connection with propulsion of the truck. As shown in Figure 3, the mount comprises a lug 45, a bolt 46, and a pair of resilient pads 47 and 48. The lug 45 is connected to, and depends from, the bottom portion of the casing 26 of the electric motor 22 and overlies, and is spaced slightly above, the web portion of the horizontally extending channel beam 16 which, as previously described, serves to cross connect the horizontally extending channel beams 14. The bolt 46 extends vertically and comprises a shank 49 and a head 50. The head, as shown in Figure 3, is located at the lower end of the shank. The central portion of the shank 49 extends through a slot 51 in the web of the horizontally extending channel beam 16. The upper end of the shank extends through a hole 52 in the lug 45 and embodies at its upper extremity a nut 53. The latter rests on the top face of the lug 45 and serves to hold the bolt 46 in connected and depending relation with the lug. The slot 51 in the web of the horizontally extending channel beam 16 extends lengthwise of the truck and permits the bolt to slide horizontally in connection with adjustment of the bearings 31 by way of the adjusting devices 38. The resilient pads 47 and 48 serve as shock absorbers and are preferably formed of solid vulcanized rubber. They are ring shaped and extend around the shank 49 of the bolt 46. The pad 47 is disposed between the lug 45 and the upper face of the slot defining portion of the web of the channel beam 16. A metallic washer 54 surrounds the shank of the bolt 46 and is interposed between the upper end of the pad 47 and the bottom face of the lug 45. A washer 55 surrounds the shank 49 of the bolt and is interposed between the lower end of the pad 47 and the upper face of the web of the channel beam 16. The resilient pad 48 is disposed between the bottom face of the web of the channel beam 16 and the head 50 of the bolt 46. A washer 56 surrounds the shank of the bolt and is interposed between the bolt head 50 and the lower end of the pad 48. A washer 57 surrounds the bolt shank 49 and is interposed between the upper end of the pad 48 and the bottom face of the web of the channel beam 16. When the electric motor 22 is started it tends to swing in one direction or the other bodily about the axis of the drive shaft 24, depending upon the direction of drive of the armature. The pads 47 and 48 serve to prevent such turning movement of the motor and because of their resiliency absorb any shock incident to starting of the motor in either direction. By absorbing shock in connection with starting of the motor the life and efficiency of the driving mechanism are materially increased. The nut 53 is normally in a partially tightened position so as slightly to compress the two pads 47 and 48. It is of the castellated variety and is held in place by way of a cotter pin. The nut 53 is not so tightened as to prevent ready sliding movement of the bolt 46 in the slot 51 in connection with shift of the assembly of motor, speed reducing unit and drive shaft by manipulation of the adjusting device 38.

The operation of the driving mechanism is as follows: When the electric motor 22 is driven in one direction it operates through the medium of the worm 29, the worm gear 30, the drive shaft 24 and the chain and sprocket connections 25 to propel the truck 8 in one direction along the track. Reverse drive of the electric motor operates to propel the truck in the opposite direction along the track. When the electric motor 22 is started in connection with drive thereof in one direction so it tends to swing upwards about the axis of the drive shaft 24 the resilient pad 48 restricts and cushions upward swing of the motor and absorbs any shock incident to starting of the motor in said one direction. When the motor 22 is started in connection with drive thereof in the opposite direction so it tends to swing downwards about the axis of the drive shaft 24 the resilient pad 41 is brought into play and serves to restrict and cushion downward swing of the motor and absorbs shock incident to starting of the motor for drive in said reverse direction. When the chains 34 of the chain and sprocket drive connections 25 become loose due to wear or use the bearings 31 are shifted rearwards along the slide bars 35 until the chains are tightened to the desired extent. Rearward shift of the bearings is effected by turning the bolts 39 so as to effect rearward feed thereof. After adjustment of the bearings to the desired extent the jam nuts 40 are tightened.

The herein described truck driving mechanism is not only simple in design but also compact. It is characterized by high efficiency, long life and facility of adjustment. It is also characterized by the fact that the unitary assembly of electric motor, speed reducing unit and drive shaft is supported solely by the two bearings 31 for the drive shaft and the slidable and resilient or cushion type mount for the electric motor. A further characteristic of the present driving mechanism resides in the fact that the drive shaft 24 is so located with respect to the axle 17 for the traction wheels 12 that the downward component of the drive chains in either direction of operation will more than offset the motor reaction which would tend to raise the bearings 31 off the slide bars 35. In other words, the specific location or arrangement of the drive shaft with respect to the axle 17 is such that the bearings 31 are not vertically displaced in connection with operation of the electric motor even though they rest loosely on the slide bars.

Whereas the drive mechanism has been illustrated as a medium for propelling a truck of the type that is used in connection with a foundry machine of the type shown in United States Letters Patent No. 1,774,076 it is to be understood that the mechanism may be used to drive other types or forms of trucks and also in other capacities. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. Driving mechanism adapted for use in connection with a supporting structure having a rotatable element thereon, and comprising a bearing disposed adjacent the element and mounted on the structure to move to and from said element, an assembly embodying an electric motor, a speed reducing unit connected for drive by the motor, and a drive shaft connected for drive by the unit and journalled in the bearing, and movable as a unit with said bearing and also tiltable about the axis of the shaft, a chain and sprocket driving connection between the shaft and the element, and a mount between the supporting structure and the assembly arranged to permit movement of the assembly in connection with movement of the bearing and also yieldingly to limit tilting of the assembly in either direction.

2. Driving mechanism adapted for use in connection with a supporting structure having a rotatable element thereon, and comprising a bearing disposed adjacent the element and mounted on the structure to move to and from said element, an assembly embodying a reversible electric motor, a speed reducing unit connected for drive by the motor, and a drive shaft connected for drive by the unit, journalled in the bearing, and movable as a unit with said bearing and also tiltable about the axis of the shaft, a chain and sprocket driving connection between the shaft and the element, and supporting means between the supporting structure and the motor arranged and designed to permit movement of the assembly in connection with movement of the bearing and also yieldingly to limit tilting of the assembly in either direction.

3. The combination with a truck having a pair of laterally spaced coaxial traction wheels therefor; of a pair of bearings disposed over and to one side of the wheels respectively and mounted on the truck so as to slide horizontally to and from the wheels, an assembly embodying an electric motor, a speed reducing unit connected for drive by the motor, and a drive shaft connected for drive by the unit and having the ends thereof journalled in the bearings and connected by chain and sprocket connection to the wheels, and movable as a unit with said bearings and also tiltable in either direction about the axis of the shaft, releasable means on the truck for holding the bearings in the various positions into which they are moved, and cushion type supporting means between the truck and the motor arranged to permit movement of the assembly in connection with movement of the bearings and also yieldingly to limit tilting of the assembly.

MURRAY G. CLAY.